(12) United States Patent
Kongkanand

(10) Patent No.: US 9,425,462 B2
(45) Date of Patent: Aug. 23, 2016

(54) PREPARATION OF HOLLOW PT AND PT-ALLOY CATALYSTS

(71) Applicant: GM GLOBAL TECHNOLOGY OPERATIONS LLC, Detroit, MI (US)

(72) Inventor: Anusorn Kongkanand, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 222 days.

(21) Appl. No.: 14/044,165

(22) Filed: Oct. 2, 2013

(65) Prior Publication Data

US 2014/0106261 A1    Apr. 17, 2014

Related U.S. Application Data

(60) Provisional application No. 61/713,778, filed on Oct. 15, 2012.

(51) Int. Cl.
| | | |
|---|---|---|
| *H01M 4/92* | (2006.01) | |
| *H01M 4/88* | (2006.01) | |
| *B01J 35/00* | (2006.01) | |
| *B01J 37/02* | (2006.01) | |
| *B01J 23/42* | (2006.01) | |

(52) U.S. Cl.
CPC ............ *H01M 4/8814* (2013.01); *B01J 35/008* (2013.01); *B01J 35/0033* (2013.01); *H01M 4/881* (2013.01); *H01M 4/8807* (2013.01); *H01M 4/8828* (2013.01); *H01M 4/92* (2013.01); *H01M 4/921* (2013.01); *B01J 23/42* (2013.01); *B01J 37/0225* (2013.01); *Y02E 60/50* (2013.01)

(58) Field of Classification Search
CPC ..... H01M 4/8814; H01M 4/92; H01M 4/921
USPC .......................................................... 429/535
See application file for complete search history.

(56) References Cited

U.S. PATENT DOCUMENTS

| | | | |
|---|---|---|---|
| 2012/0219800 A1 | 8/2012 | Torimoto et al. | |
| 2013/0177838 A1* | 7/2013 | Wang ....................... | B01J 23/52 429/524 |

FOREIGN PATENT DOCUMENTS

WO    2012009467 A1    1/2012

OTHER PUBLICATIONS

Kuwabata, S. et al., "Room-Temperature Ionic Liquid. A New Medium for Material Production and Analyses under Vacuum Conditions," J. Phys. Chem. Lett. 2010, 1, 3177-3188.

Suzuki, T. et al., "Nanosize-Controlled Syntheses of Indium Metal Particles and Hollow Indium Oxide Particles via he Sputter Deposition Technique in Ionic Liquids," Chem. Mater. 2010, 22, pp. 5209-5215.

* cited by examiner

*Primary Examiner* — Edward Cain
(74) *Attorney, Agent, or Firm* — Brooks Kushman P.C.

(57) ABSTRACT

A method for preparing hollow platinum or platinum-alloy catalysts includes a step of forming a plurality of low-melting-point metal nanoparticles. A platinum or platinum-alloy coating is then deposited onto the low-melting-point metal nanoparticles to form platinum or platinum-alloy coated particles. The low-melting-point metal nanoparticles are then removed to form a plurality of hollow platinum or platinum-alloy particles.

21 Claims, 2 Drawing Sheets

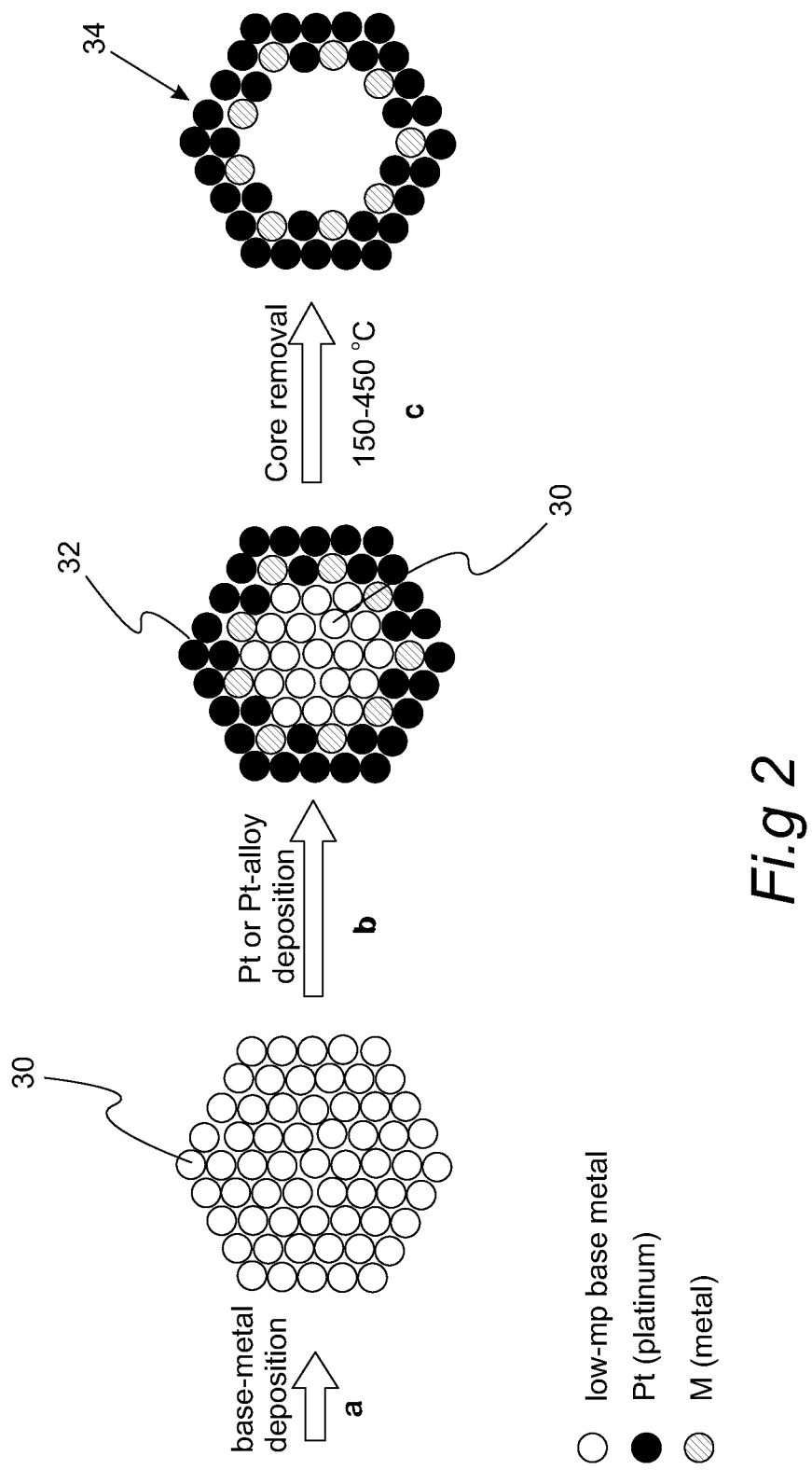

PREPARATION OF HOLLOW PT AND PT-ALLOY CATALYSTS

CROSS-REFERENCE TO RELATED APPLICATIONS

This application claims the benefit of U.S. provisional application Ser. No. 61/713,778 filed Oct. 15, 2012, the disclosure of which is hereby incorporated in its entirety by reference herein.

TECHNICAL FIELD

The present invention relates to catalysts for fuel cell applications

BACKGROUND OF THE INVENTION

In proton exchange membrane type fuel cells, hydrogen is supplied to the anode as fuel, and oxygen is supplied to the cathode as the oxidant. The oxygen can either be in pure form ($O_2$) or air (a mixture of $O_2$ and $N_2$). Proton exchange membrane ("PEM") fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Typically, the ion conductive polymer membrane includes a perfluorosulfonic acid (PFSA) ionomer.

Each catalyst layer has finely divided catalyst particles (for example, platinum particles), supported on carbon particles, to promote oxidation of hydrogen at the anode, and reduction of oxygen at the cathode. Protons flow from the anode through the ion conductive polymer membrane to the cathode where they combine with oxygen to form water which is discharged from the cell.

The MEA is sandwiched between a pair of porous gas diffusion layers ("GDL") which, in turn, are sandwiched between a pair of electrically conductive flow field elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cells in stacks in order to provide high levels of electrical power.

In many fuel cell applications, electrode (catalyst) layers are formed from ink compositions that include a precious metal and a perfluorosulfonic acid polymer (PFSA). For example, PFSA is typically added to the Pt/C catalyst ink in electrode layer fabrication of proton exchange membrane fuel cells to provide proton conduction to the dispersed Pt nanoparticle catalyst as well as binding of the porous carbon network. Traditional fuel cell catalysts combine carbon black with platinum deposits on the surface of the carbon, along with ionomers. The carbon black provides (in part) a high surface area conductive substrate. The platinum deposits provide a catalytic behavior, and the ionomers provide a proton conductive component. The electrode is formed from an ink that contains the carbon black catalyst and the ionomer, which combine on drying to form an electrode layer.

Although the present technologies for making electrode inks for fuel cell applications work reasonably well, there are still concerns that need to be addressed. For example, the catalyst layers that are formed from such inks tend to be mechanically fragile and have suboptimal oxygen reduction activity.

Accordingly, the present invention provides improved methods for the preparation of catalysts that are useful in fuel cell applications.

SUMMARY OF THE INVENTION

The present invention solves one or more problems of the prior art by providing in at least one embodiment a method of preparing hollow platinum and hollow platinum alloy catalysts. The method includes a step of forming a plurality of low-melting-point core metal nanoparticles. A platinum or platinum-alloy coating is then deposited onto the low-melting-point metal nanoparticles to form a shell of platinum or platinum-alloy coating the core metal nanoparticles. The low-melting-point metal nanoparticles are then removed to form a plurality of hollow platinum or platinum-alloy particles. A room-temperature-ionic liquid is used as a medium when depositing platinum or platinum-alloy onto the core metal nanoparticles or melting the low-melting-point core metal nanoparticles or annealing the shell to improve its catalytic activity. Advantageously, the hollow platinum catalysts formed by the method of the present embodiment are promising candidates for future generation fuel cell catalysts due to their high oxygen reduction activity. Moreover, the hollow platinum catalysts do not contain base-metals thereby obviating concerns related to base-metal-dissolution-related durability.

BRIEF DESCRIPTION OF THE DRAWINGS

Exemplary embodiments of the present invention will become more fully understood from the detailed description and the accompanying drawings, wherein:

FIG. 2 is a schematic flowchart showing the preparation of hollow platinum and/or platinum alloy particles.

DESCRIPTION OF THE INVENTION

Figure 1:
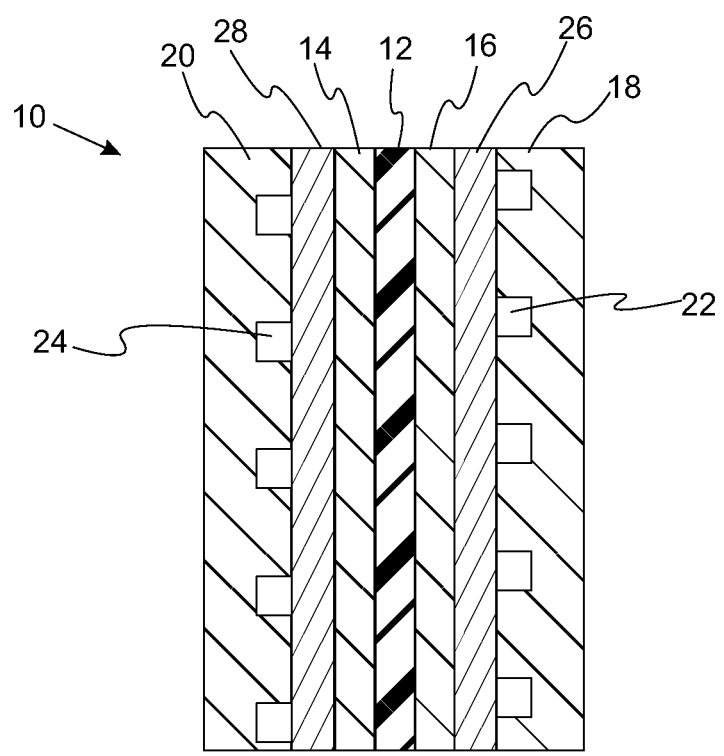
FIG. 1 provides a schematic illustration of a fuel cell incorporating hollow platinum catalysts in at least one of the electrodes.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; molecular weights provided for any polymers refer to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

With reference to FIG. 1, a schematic cross section of a fuel cell that incorporates a catalyst or a membrane is provided. Proton exchange membrane (PEM) fuel cell 10 includes polymeric ion conducting membrane 12 disposed between cathode catalyst layer 14 and anode catalyst layer 16. Fuel cell 10 also includes flow field plates 18, 20, gas channels 22 and 24, and gas diffusion layers 26 and 28. Advantageously, cathode catalyst layer 14 and/or anode catalyst layer 16 include hollow platinum or platinum-alloy particles formed by the method set forth below. During operation of the fuel cell, a fuel such as hydrogen is fed to the flow field plate 20 on the anode side and an oxidant such as oxygen is fed to the flow field plate 18 on the cathode side. Hydrogen ions that are generated by anode catalyst layer 16 migrate through polymeric ion conducting membrane 12 where they react at cathode catalyst layer 14 to form water. This electrochemical process generates an electric current through a load connect to flow field plates 18 and 20.

In an embodiment, a method of preparing hollow platinum and hollow platinum-alloy catalysts is provided. With reference to FIG. 2, the method includes a step of forming a plurality of low-melting-point metal (LMPM) nanoparticle cores 30 from a low-melting-point metal as set forth in step a). Typically, the low-melting-point metals used to form the LMPM particles have a melting point less than about 400° C. In a refinement, the low-melting-point metals used to form the LMPM particles have a melting point less than about 300° C. In another refinement, the low-melting-point metals used to form the LMPM particles have a melting point less than about 200° C. In still another refinement, the low-melting-point metals used to form the LMPM particles have a melting point greater than about 100° C. The low melting temperatures allow removal of the core without the use of acid or other oxidizing agents that can compromise the integrity of the Pt shell. Examples for suitable metals for forming the LMPM particles include, but are not limited to, In, Ga, Ge, Sn, Sb, Tl, Pb, Bi, Zn, Cd, Hg, and the like. In a refinement, the LMPM particles are formed by using a room-temperature-ionic liquid (RTIL) with the low-melting-point metal. In particular, the LMPM particles are deposited into the RTIL. Typically, the RTIL is oxygen free. The article *Room-Temperature Ionic Liquid. A New Medium for Material Production and Analyses under Vacuum Conditions* by S. Kuwabata et al., J. Phys. Chem. Lett. 2010, 1, 3177-3188 describes a method for depositing metal particles into a RTIL, the entire disclosure of this article is hereby incorporated by reference. As set forth in S. Kuwabata et al., metal nanoparticles may be formed by sputtering, plasma deposition, or electron beam and γ-ray irradiation. In the sputtering method, a low-melting point metal target is bombarded with $Ar^+$ and $N2^+$ ions at reduced pressure and deposited onto the RTIL. The plasma deposition directs metal ions towards the RTIL and requires that the RTIL have a low vapor pressure. The electron beam and γ-ray irradiation techniques irradiate a solution containing metal salts thereby inducing reduction to the metal particles.

The low melting metal nanoparticles are characterized by their spatial dimensions. In a refinement, the low melting metal nanoparticles have an average diameter up to 500 nanometers. In another refinement, the low melting metal nanoparticles have an average diameter from about 0.5 to about 500 nanometers. In still another refinement, the low melting metal nanoparticles have an average diameter from about 1 to about 100 nanometers.

In step b), a platinum or platinum-alloy coating 32 is then deposited onto the low-melting-point metal nanoparticles to form platinum or platinum-alloy coated particles. In a refinement, platinum or platinum-alloy is deposited onto the low-melting-point metal nanoparticles by contacting the nanoparticles with a platinum precursor or a platinum alloy precursor. Examples of suitable platinum precursors include, but are not limited to, $K_2PtCl_6$, $K_2PtCl_4$, $H_2PtBr_4$, $Pt(NO_3)_2$, Pt acetylacetonate, and combinations thereof. Typically, the platinum or platinum-alloy precursor is reduced to metal with a chemical reductant or by solvent decomposition. This reduction is accomplished by selecting an appropriate reducing agent and reaction temperature. In this aspect, the wide operating temperature window of RTIL is advantageous in optimizing the process. For example, after addition of platinum and/or platinum alloy-metal precursors to the LMPM-nanoparticle RTIL solution, hydrogen gas, CO gas, borohydride, or other reductants are used to reduce the metal on the core.

In another variation, platinum or platinum-alloy is deposited onto the low-melting-point metal nanoparticles by Galvanic displacement of metal in the low-melting-point core metal nanoparticles with platinum. Galvanic displacement utilizes the differences in reduction potentials of various metals. In particular, a platinum precursor can be reduced using an easier-oxidizing metal such as copper. As a result, platinum is reduced at the expense of Cu dissolution (oxidation) in what is essentially a battery reaction. For example, since In has a more-negative reduction potential compared to most metals including Pt, Co, and Ni (note that PtCo and PtNi are considered one of the most promising platinum-alloy catalysts), In can be used to reduce these metals onto the low-melting-point core metal nanoparticles. This is accomplished by adding platinum and alloy-metal precursors into the de-aerated LMPM-nanoparticle RTIL solution under stirring. Any dissolved $In^{2+}$ is solvated and stabilized by the RTIL's counter ions.

In another variation, RTIL's unique chemical property to stabilize/solvate electrons that are applied by an electron beam or other radiolysis that generates solvated electrons is used to induce reduction of platinum or platinum-alloy precursor onto the low-melting-point core particles. Using this property, platinum and alloy-metal precursors are directly reduced without using added reducing agents.

In step c), the low-melting-point metal nanoparticles are then removed to form a plurality of hollow platinum or platinum-alloy particles 34. Typically, the LMPM core is removed by heating the solution containing particles to a temperature slightly above the melting point of the core metal in the RTIL. In a refinement, the core metal may escape through pin holes in the platinum or platinum-alloy coating. Finally, the resulting hollow particles may be heat treated (e.g., about 400° C.) in an inert atmosphere to improve oxygen reduction activity of a catalyst by reducing the amount of low-coordination-number surface atoms (i.e. atoms on the edge and kink). In a refinement, the hollow platinum or platinum-alloy particles have an average from about 7 atomic layers to about 1.5 nm thick.

Heat treatment at about 400° C. in an inert atmosphere is found to improve oxygen reduction activity of a catalyst by reducing the amount of low-coordination-number surface atoms (atoms on the edge and kink).

The use of RTIL gives a wide working temperature range so that one can deposit Pt shell at low temperature (which in general gives more uniform Pt shell) and melt the base metals at higher temperature. Examples of suitable RTIL are set forth in the article by S. Kuwabata. In particular, such liquids are formed from ionic compounds having a cation and anion. Examples of suitable cation components include:

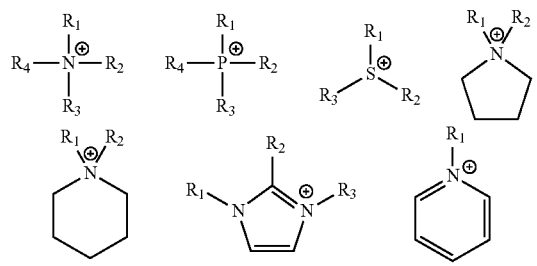

wherein $R_1$, $R_2$, and $R_3$ are each independently $C_{1-20}$ alkyl, $C_{2-20}$ alkyl ether, and the like. In particular, $R_1$, $R_2$, and $R_3$ are each independently methyl, ethyl, n-propyl, isopropyl, n-butyl, sec-butyl, t-butyl, n-hexyl, n-octyl, n-decyl, n-$C_{16}H_{33}$, $CH_3OCH_2$—, $CH_3OC_2H_4$—, and the like. Examples of suitable anion components include $[BF_4]^-$, $[B(CN)_4]^-$, $[CF_3BF_3]^-$, $[C_2F_5BF_3]^-$, $[n-C_3F_7BF_3]^-$, $[n-C_4F_9BF_3]^-$, $[(C_2F_5)_3PF_3]^-$, $[CF_3CO_2]^-$, $[CF_3SO_3]^-$, $[N(COCF_3)(SO_2CF_3)]-$, $[N(SO_2F)_2]^-$, $[EtOSO_3]-$, $[N(CN)_2]-$, $[C(CN)_3]-$, $[SCN]-$, $[SeCN]-$, $[CuCl_2]-$, $[AlCl_4]^-$, $[ZnCl_4]^{2-}$, $[F(HF)_{23}]-$, and the like. In a refinement, the RTIL is functionalized as a stabilizer for the nanoparticles to prevent agglomeration. Note that it is shown that RTIL can be easily separated from the product to form active conventional Pt/C.

In another refinement, the hollow platinum or platinum-alloy particles may be supported on carbon black particles to enhance their dispersion. The supported particle catalysts are then combined with a solvent and an optional ionomer (e.g., NAFION™—a perfluorosulfonic acid polymer). This ink composition is applied to a surface (e.g., an ion conducting layer or a gas diffusion layer) in a fuel cell component, and then dried. In this latter refinement, suitable solvents include alcohols (e.g., methanol, alcohol, propanol, and the like) and water. A combination of alcohol and water is found to be particularly useful. A typical cathode ink formulation contains 1 to 6 weight percent hollow platinum or platinum alloy particles, 8 to 16 weight percent water, 60 to 80 weight percent ethanol, and 4 to 15 weight percent ionomer. In a refinement, the ink composition is combined with a filler such as zirconia beads. Based on experience on fuel cells with state-of-the-art catalysts, platinum dispersion should be at least ~30 $m^2/g_{Pt}$.

Preparation of LMPM Nanoparticles

Preparation of the LMPM nanoparticles is accomplished by sputtering indium (In) at a rate about 20 $mA/cm^2$ onto RTIL that is spread on a glass surface under argon atmosphere (about 2 Pascal) at room temperature. The RTIL is an imidazolium-based ionic liquid with tetrafluoroborate ($BF_4$) anion. It is found that the particle size is predominantly determined by the viscosity of the RTIL. This method provides nanoparticles with good uniformity (typically 6 to 10 nm in diameter) without necessity of any stabilizer. Moreover, these nanoparticles are also found to form a colloidal solution, i.e., they remain suspended in the solution over a long period of time.

Deposition of Pt and Pt-Alloy onto LMPM Core

Deposition of a Pt or a PtCo layer is accomplished by adding $K_2PtCl_6$ or $K_2PtCl_6+Co(NO_3)_2.6H_2O$ to the imidazolium-based ionic liquids with tetrafluoroborate ($BF_4$) anion. The resulting solution is then reduced by purging with 5% hydrogen in Ar gas at 80° C. for 1 hour to deposit Pt or PtCo layer onto the LMPM particles.

Removal of LMPM Core

Removal of the LMPM core is done by heating the prepared solution slightly above the melting point of the indium core metal (157° C.). Heat treatment at about 400° C. in an inert atmosphere is found to improve oxygen reduction activity of a catalyst by reducing the amount of low-coordination-number surface atoms. Note that when galvanic displacement is used to deposit Pt or Pt-alloy layer, the In core is oxidative dissolved and therefore the LMPM core removal step is not required.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for preparing hollow platinum or platinum-alloy catalysts, the method comprising:
    forming a plurality of low-melting-point core metal nanoparticles in a non-aqueous solvent absent of oxygen;
    depositing platinum or platinum-alloy onto the low-melting-point core metal nanoparticles to form a shell of platinum or platinum-alloy coating the low-melting-point core metal nanoparticles; and
    removing the low-melting-point core metal nanoparticles from the platinum or platinum-alloy coated particles by melting to form a plurality of hollow platinum or platinum-alloy particles wherein a room-temperature-ionic liquid is used as a medium when depositing platinum or platinum-alloy onto the low-melting-point core metal nanoparticles or melting the low-melting-point core metal nanoparticles or annealing the shell to improve its catalytic activity.

2. The method of claim 1 wherein the low-melting-point core metal nanoparticles include a metal having a melting point less than about 400° C.

3. The method of claim 1 wherein the low-melting-point core metal nanoparticles include a low-melting-point metal selected from the group consisting of In, Ga, Ge, Sn, Sb, Tl, Pb, Bi, Zn, Cd, Hg, and combinations thereof.

4. The method of claim 1 wherein the low-melting-point core metal nanoparticles are formed by sputtering a metal into the non-aqueous solvent.

5. The method of claim 1 wherein the non-aqueous solvent includes a room-temperature-ionic liquid (RTIL).

6. The method of claim 1 wherein the low-melting-point core metal nanoparticles have an average diameter up to 500 nanometers.

7. The method of claim 1 wherein the low-melting-point core metal nanoparticles have an average diameter from about 0.5 to about 500 nanometers.

8. The method of claim 1 wherein the low-melting-point core metal nanoparticles have an average diameter from about 1 to about 100 nanometers.

9. The method of claim 1 wherein the non-aqueous solvent is a room temperature ionic liquid having cations and anions.

10. The method of claim 9 wherein the cations are selected from the group consisting of:

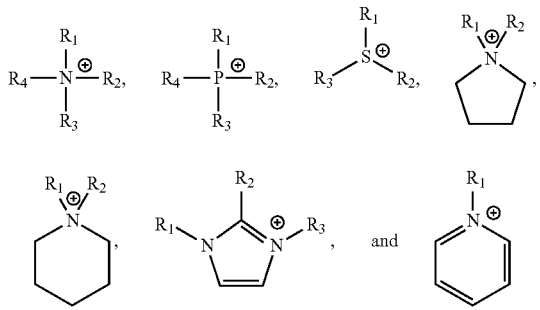

wherein $R_1$, $R_2$, and $R_3$ are each independently $C_{1-20}$ alkyl or $C_{2-20}$ alkyl ether.

11. The method of claim 10 wherein $R_1$, $R_2$, and $R_3$ are each independently methyl, ethyl, n-propyl, isopropyl, n-butyl, sec-butyl, t-butyl, n-hexyl, n-octyl, n-decyl, n-$C_{16}H_{33}$, $CH_3OCH_2$—, and $CH_3OC_2H_4$—.

12. The method of claim 9 wherein the anions are selected from the group consisting of $[BF_4]^-$, $[B(CN)_4]^-$, $[CF_3BF_3]^-$, $[C_2F_5BF_3]^-$, $[n-C_3F_7BF_3]^-$, $[n-C_4F_9BF_3]^-$, $[(C_2F_5)_3PF_3]^-$, $[CF_3CO_2]^-$, $[CF_3SO_3]^-$, $[N(COCF_3)(SO_2CF_3)]$—, $[N(SO_2F)_2]^-$, $[EtOSO_3]$—, $[N(CN)_2]$—, $[C(CN)_3]$—, $[SCN]$—, $[SeCN]$—, $[CuCl_2]$—, $[AlCl_4]^-$, $[ZnCl_4]^{2-}$, or $[F(HF)_{23}]$—.

13. The method of claim 9 wherein the room temperature ionic liquid is functionalized to prevent agglomeration.

14. The method of claim 1 wherein the hollow platinum or platinum-alloy particles are combined with a solvent, an ionomer, and an optional filler to form an ink composition.

15. The method of claim 14 wherein the ink composition is applied to a surface in a fuel cell component and then dried.

16. The method of claim 15 wherein the fuel cell component is an ion conducting layer or a gas diffusion layer.

17. The method of claim 1 wherein platinum or platinum-alloy is deposited onto the low-melting-point core metal nanoparticles by contacting the low-melting-point core metal nanoparticles with a platinum or a platinum-alloy precursor.

18. The method of claim 17 wherein the platinum-alloy precursor is selected from the group consisting of $K_2PtCl_6$, $K_2PtCl_4$, $H_2PtBr_4$, $Pt(NO_3)_2$, Pt acetylacetonate, and combinations thereof.

19. The method of claim 18 wherein the platinum-alloy precursor is reduced to metal with a chemical reductant or by solvent decomposition.

20. The method of claim 1 wherein platinum or platinum-alloy is deposited onto the low-melting-point core metal nanoparticles by Galvanic displacement of metal in the low-melting-point core metal nanoparticles with platinum.

21. The method of claim 1 wherein the hollow platinum or platinum-alloy particles have an average from about 7 atomic layers to about 1.5 nm thick.

* * * * *